(12) United States Patent
Cook et al.

(10) Patent No.: US 10,110,450 B2
(45) Date of Patent: Oct. 23, 2018

(54) MONITORING ELEMENT HIERARCHIES IN A CLOUD COMPUTING SYSTEM

(71) Applicant: VMWARE, INC., Palo Alto, CA (US)

(72) Inventors: Jonathan Cook, Palo Alto, CA (US); Vinay Eswara, Bangalore (IN); Jai Krishna, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 163 days.

(21) Appl. No.: 15/132,244

(22) Filed: Apr. 19, 2016

(65) Prior Publication Data

US 2017/0187590 A1 Jun. 29, 2017

(30) Foreign Application Priority Data

Dec. 29, 2015 (IN) .......................... 7044/CHE/2015

(51) Int. Cl.
| | |
|---|---|
| *H04L 12/26* | (2006.01) |
| *H04L 29/08* | (2006.01) |
| *H04L 12/24* | (2006.01) |
| *G06F 12/00* | (2006.01) |

(52) U.S. Cl.
CPC .......... *H04L 43/08* (2013.01); *H04L 41/5009* (2013.01); *H04L 41/5096* (2013.01); *H04L 67/10* (2013.01); *H04L 67/1097* (2013.01); *H04L 67/22* (2013.01); *H04L 67/28* (2013.01)

(58) Field of Classification Search
USPC ................................. 709/224, 200, 203, 223
See application file for complete search history.

(56) References Cited

U.S. PATENT DOCUMENTS

| | | | | |
|---|---|---|---|---|
| 7,979,245 | B1* | 7/2011 | Bourlatchkov | ..... G06F 11/3409 703/2 |
| 8,346,921 | B1* | 1/2013 | Goodspeed | ............ G06Q 30/02 709/200 |
| 9,043,329 | B1* | 5/2015 | Patton | ................. G06F 17/3087 707/740 |
| 9,424,333 | B1* | 8/2016 | Bisignani | .......... G06F 17/30592 |
| 2011/0153603 | A1* | 6/2011 | Adiba | ............... G06F 17/30548 707/737 |
| 2013/0238862 | A1* | 9/2013 | Cong | ................... G06F 11/3037 711/147 |
| 2015/0186497 | A1* | 7/2015 | Patton | ............... G06F 17/30598 707/740 |
| 2016/0171089 | A1* | 6/2016 | Richard | ............ G06F 17/30961 707/741 |
| 2017/0187590 | A1* | 6/2017 | Cook | ...................... H04L 43/08 |

* cited by examiner

*Primary Examiner* — Jude Jean Gilles
(74) *Attorney, Agent, or Firm* — Patterson + Sheridan, LLP

(57) ABSTRACT

An example method of monitoring elements in a cloud computing system includes partitioning an address space of a hierarchy of service elements into a plurality of address subspaces managed by a respective plurality of processing nodes. The method further includes receiving time series data from a service element, routing the time series data to a first processing node based on an address of the service element within the hierarchy, and processing the time series data at the first processing node to update metric data maintained for the service element. The method further includes routing the time series data to a second processing node based on an address of a parent service element above the service element in the hierarchy, and processing the time series data at the second processing node to update metric data maintained for the parent service element.

14 Claims, 6 Drawing Sheets

MONITORING ELEMENT HIERARCHIES IN A CLOUD COMPUTING SYSTEM

RELATED APPLICATIONS

Benefit is claimed under 35 U.S.C. 119(a)-(d) to Foreign Application Serial No. 7044/CHE/2015 filed in India entitled "MONITORING ELEMENT HIERARCHIES IN A CLOUD COMPUTING SYSTEM", filed on Dec. 29, 2015, by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

Cloud services typically incorporate monitoring capabilities that monitor service elements. Service elements are often organized in hierarchies to aid logical grouping, physical organization, assignment to security realms, and the like. The service elements can output various metrics that are collected by the monitoring system. In many cases, some mathematical function of a metric is also of interest at various points in the hierarchy above the element on which the metric is measured.

SUMMARY

One or more embodiments provide techniques for monitoring element hierarchies in a cloud computing system. In an embodiment a method of monitoring service elements in a cloud computing system includes partitioning an address space of a hierarchy of service elements into a plurality of address subspaces managed by a respective plurality of processing nodes. The method further includes receiving time series data from a service element in the hierarchy of service elements. The method further includes routing the time series data to a first processing node of the plurality of processing nodes based on an address of the service element within the hierarchy of service elements. The method further includes processing the time series data at the first processing node to update metric data maintained for the service element. The method further includes routing the time series data to a second processing node of the plurality of processing nodes based on an address of a parent service element above the service element in the hierarchy of service elements. The method further includes processing the time series data at the second processing node to update metric data maintained for the parent service element.

In another embodiment, a system includes a plurality of entities in a computer system that output time series data, the plurality of entities being service elements in a hierarchy of service elements. The system further includes a monitoring system, coupled to the plurality of entities, having a plurality of processing nodes. The monitoring system is configured to partition an address space of the hierarchy of service elements into a plurality of address subspaces respectively managed by a respective plurality of processing nodes. The monitoring system is further configured to receive first time series data from a service element in the hierarchy of service elements. The monitoring system is further configured to route the first time series data to a first processing node of the plurality of processing nodes based on an address of the service element within the hierarchy of service elements. The monitoring system is further configured to process the first time series data at the first processing node to update metric data maintained for the service element. The monitoring system is further configured to route the first time series data to a second processing node of the plurality of processing nodes based on an address of a parent service element above the service element in the hierarchy of service elements. The monitoring system is further configured to process the first time series data at the second processing node to update metric data maintained for the parent service element.

Further embodiments include a non-transitory computer-readable storage medium comprising instructions that cause a computer system to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present disclosure provide an operational monitoring system that enables the collection, storage, and presentation of metrics of a computing system, such as a hybrid cloud computing system. In one embodiment of the computing system, monitored elements, such as cloud service elements, as declared to be addressable and belong to multi-way hierarchies with one unique address per hierarchy. The cloud service elements are partitioned into "subspaces"; each subspace served by a monitoring system node. Metrics collected at each level of the hierarchy can be automatically fed upward to parents in the hierarchy, processing in real-time (in contrast to bulk, offline processing), and made available immediately without requiring dedicated data processing subsystems (e.g., data warehouses, distributed Hadoop cluster, batch jobs, etc.). Existing general-purpose monitoring systems are unable to pre-compute hierarchical data natively in real-time as part of the operational system. In one embodiment, the described system can achieve horizontal scaling with respect to the number of monitored service elements for processing element data. In some embodiments, data processing for any service element can be transparently failed over to surviving nodes should any monitoring system nodes fail.

Figure 1:
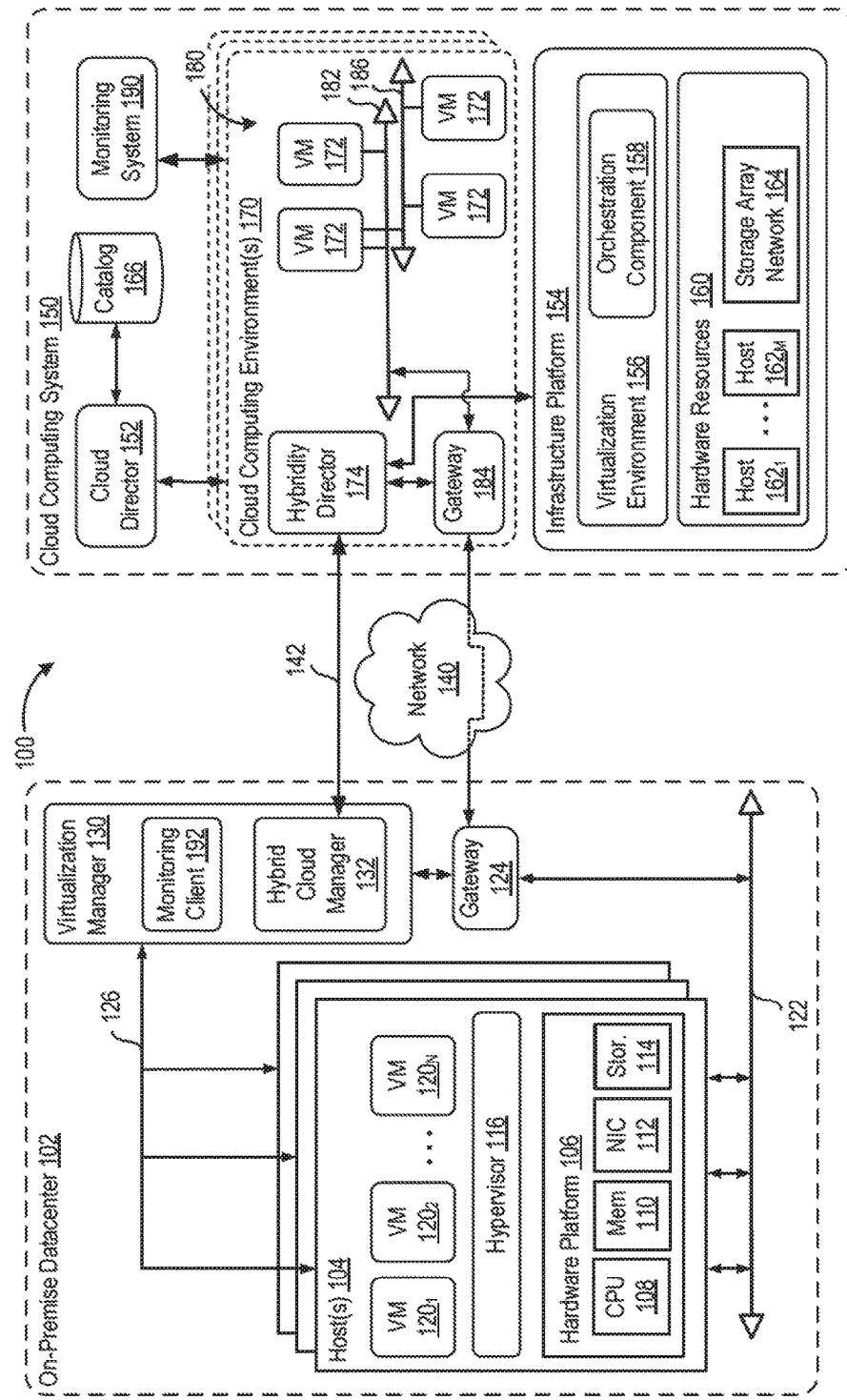
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system implementing an on-premise datacenter 102 and a virtualized computing system implementing a cloud computing system 150. Hybrid cloud computing system 100 is configured to provide a common platform for managing and executing virtual workloads seamlessly between on-premise datacenter 102 and cloud computing system 150. In one embodiment, on-premise datacenter 102 may be a data center controlled and administrated by a particular enterprise or business organization, while cloud computing system 150 may be operated by a cloud computing service provider and exposed as a service available to account holders, such as the particular enterprise in addition to other enterprises. As such, on-premise datacenter 102 may sometimes be referred to as a "private" cloud, and cloud computing system 150 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

On-premise datacenter 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored, in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within on-premise datacenter 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

On-premise datacenter 102 includes a virtualization management component (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in on-premise datacenter 102, or alternatively, running as a VM in one of hosts 104. One example of a virtualization manager is the VMware vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one frost to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in on-premise datacenter 102 with connectivity to an external network 140 (e.g., Internet). Gateway 124 may manage external public IP addresses for VMs 120 and route traffic incoming to and outgoing from on-premise datacenter 102 and provide networking services, such as firewalls, network address translation (NAT), dynamic host configuration protocol (DHCP), load balancing, and virtual private network (VPN) connectivity over a network 140.

In one embodiment, virtualization manager 130 includes a monitoring module (depicting as monitoring client 192) configured to interface with a monitoring system 190 in cloud computing system 150. An administrator can use monitoring client 192 to request and obtain various metrics, aggregated metrics, and the like with respect to various service elements being hosted in cloud computing system 150. Operation of monitoring system 190 is described below.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to on-premise datacenter 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc. although other technologies may be utilized. Cloud director 152 receives provisioning requests submitted (e.g., via. REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1 cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120 as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one, or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN connectivity over a network 140 with another VPN endpoint, such as a gateway 124 within on-premise datacenter 102. In other embodiments, gateway 184 may be configured to connect to communicate with on-premise datacenter 102 using a high-throughput, dedicated link (depicted as a direct connect 142) between on-premise datacenter 102 and cloud computing system 150. In one or more embodiments, gateways 124 and 184 are configured to provide a "stretched" layer-2 (L2) network that spans on-premise datacenter 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in on-premise datacenter 102 to enable a common virtualized computing platform between on-premise datacenter 102 and cloud computing system 150. Hybridity director 174 (e.g., executing, as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

In an embodiment, cloud computing system 150 includes monitoring system 190. Monitoring system 190 provides a framework for collecting and managing service elements in cloud computing system 150. The service elements can include entities that emit time series data. Time series data can be any sequence of values emitted at periodic or aperiodic intervals. The values can be numbers (e.g., 1.2), strings (e.g., "Windows"), or a combination thereof. The values are associated with metrics, such as utilization metrics, performance metrics, information metrics, and the like. A metric can be specified by one or more attributes that provide context for the values (e.g., "CPU" for CPU utilization, "OS" for operating system type, etc.). Entities can transmit time series data in packets in a structured or semi-structured form having various formats, such as extensible markup language (XML), JavaScript Object Notation (JSON), or the like, or in unstructured form (the packets collectively refereed to herein as "metric packets"). A metric packet can include one or more values for each of one or more metrics, as well as other information, such as timestamps for the values, identifying information for the source of the metric data, and the like (generally referred to as "metric data").

Cloud computing system 150 support various hosted services provided to tenants. The hosted services can be of various types, such as include infrastructure-as-a-service (IaaS), platform-as-a-service (PaaS), software-as-a-service (SaaS), and the like. Each hosted service includes one or more elements ("service elements"). Some service elements can be entities that transmit time series data or have time series data transmitted on their behalf ("raw metric data"). Other service elements can be logical collections of the entities. Such service elements can be associated with mathematical functions of metric data ("aggregated metric data"). Entities can include, for example, host computers, hypervisors virtual machines, software applications, and the like, that are configured to output time series data. Service elements can include entities, as well as logical collections of entities (e.g., clusters, racks, data centers, service instances, etc.).

The service elements can be part of one or more hierarchies. For example, cloud computing system 150 can provide an on-demand computing service as an IaaS. In an on-demand computing service, the primary monitored element can be a VM. A VM will typically existing in a virtual, tenant-facing service hierarchy, such as:

Tenant
  Service
    Service Instance
      Virtual Data Center
        Virtual Machine (VM)

In such a hierarchy, the VM is entity and service element having associated time series data, such as CPU utilization values. The VM is also part of a physical, tenant-invisible, operator-facing hierarchy, such as:

Region
  Datacenter
    Cluster
      Rack
        Server
          Virtual Machine (VM)

In such a hierarchy, the Server is an entity and service element having associated time series data, such as temperature values. In some cases, some mathematical function of a metric is also of interest at various points within a hierarchy above the service element on which the metric is measured. For example, monitoring system 190 can compute an average temperature value for the Datacenter service element as a rolled-up average of the temperature values for constituent Server service elements. In another example, monitoring system 190 can compute an average CPU utilization value for the Virtual Data. Center service element as a rolled-up average of the CPU utilization values for constituent VM service elements.

In monitoring system 190, monitored service elements are declared to be addressable and belong to one or more hierarchies. Monitoring system 190 assigns each monitored service element an address within each hierarchy to which it belongs. Monitoring system 190 dynamically partitions the address space for a given hierarchy into address subspaces (also referred to as "partitions"), each of which is served by a dedicated processing node. Monitoring system 190 routes incoming metric packets among the processing nodes based on address. The processing nodes process the metric data and then recursively feed, upward metric packets among the processing nodes based on addresses of parent service elements in the hierarchy. This allows for processing of metric data at higher levels in the hierarchy (e.g., generate of aggregated metric data).

Monitoring system 190 can add or remove processing nodes on-demand, which triggers repartitioning of the address space for a given service element hierarchy. As such, monitoring system 190 can achieve horizontal scaling with respect to the number of monitored service elements. Further, data processing for any service element can be transparently failed-over to surviving processing nodes when a given processing node fails.

Figure 2:
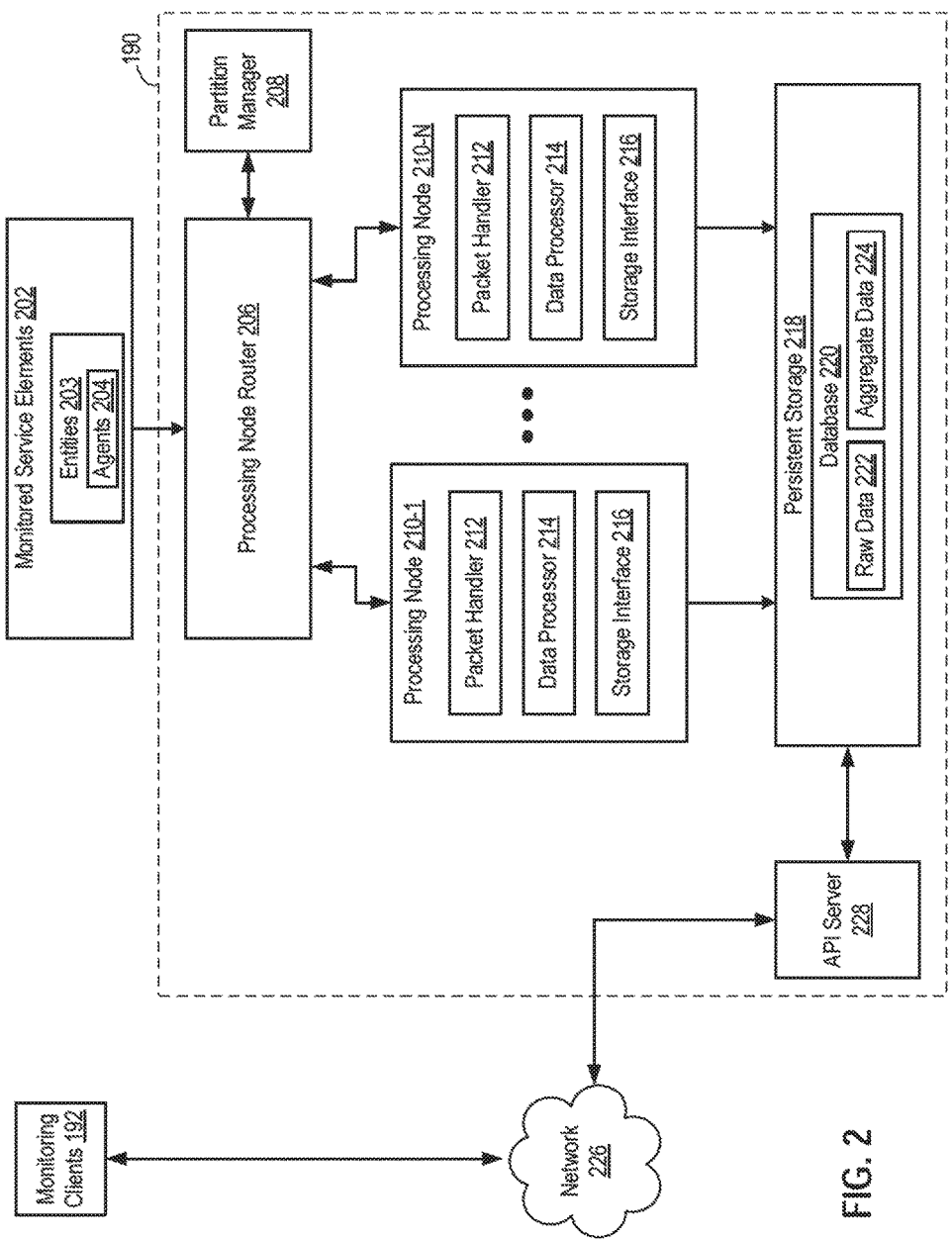
FIG. 2 is a block diagram depicting a monitoring system according to embodiments.

FIG. 2 is a block diagram depicting monitoring system 190 according to embodiments. Monitoring system 190 includes a processing node router 206, partition manager 208, a plurality of processing nodes ("processing nodes 210-1 through 210-N"), and a persistent storage system ("persistent storage 218"). Monitoring system 190 can also include an application programming interface (API) server 228. Monitoring system 190 can be implemented using one or more computers, including one or more physical computers, one or more virtual computing instances, or a combination thereof.

Monitoring system 190 is configured to receive time series data from entities 203 within monitored service elements 202. Entities 203 can include various elements, such as VMs, host computers, software applications, and the like. Monitored service elements 202 include entities 203, as well as logical collections of entities 203 (e.g., clusters, racks, data centers, etc.). Entities 203 include or otherwise communicate with agents 204, which transmit metric packets. As discussed above, the time series data includes metrics, which can be transmitted in metric packets having various formats (e.g., XML, JSON, etc.). Agents 204 can include software configured to monitor entities 203, measure metrics, and transmit the metrics in metric packets to monitoring system 190. An example fragment of a metric packet in JSON format for a CPU utilization metric is:

```
{
    name: CPU,
    data: [
        (timestamp : 2014-08-01T13:00:00Z, value : 1.0),
        (timestamp : 2014-08-01T13:01:00Z, value : 0.01),
        (timestamp : 2014-08-01T13:02:00Z, value : 0.01),
        (timestamp : 2014-08-01T13:03:00Z, value : 1.8),
        (timestamp : 2014-08-01T13:04:00Z, value : 2.0)
    ]
}
```

In the example, the metric packet includes values "1.0", "0.01", "0.01", "1.8", and "2.0" measured at particular times according to the timestamps having a name attribute of "CPU" corresponding to a CPU utilization metric. The above metric packet fragment is merely one example. In general, a metric packet can include metric data comprising one or more values for each of one or more metrics, along with timestamps, attributes, and the like associated with the value(s) and metric(s), which can be expressed in various formats. A metric packet can also include some identifying information associated its monitored service element.

Processing node router 206 is configured to receive time series data for monitored service elements 202 in metric packets from agents 204. Processing node router 206 cooperates with partition manager 208 to route metric packets to the appropriate processing nodes based on address(es) assigned to monitored service elements 202. As described above, a given monitored service element can be part of one or more hierarchies. Within each hierarchy, monitoring system 190 associates a unique address to each monitored service element. As such, a given monitored service element can have one or more addresses assigned thereto. Addresses can be formed from various types of information associated with the service elements in a particular hierarchy and can be expressed in various formats (e.g., XML, JSON etc.). An example address fragment in JSON format is:

```
{ "address" :
    [
        {"level_name" : "svcInstance", "id" : "<Service instance ID>"},
        {"level_name" : "VDC", "id" : "<VDC ID>"},
        {"level_name" : "VM", "id" : "<VM ID>"}
    ]
}
```

The example address fragment defines an address for a VM having an id of <VM ID>, which is part of a Virtual Data Center having an id of <VDC ID>, which is part of a Service Instance having an id of <Service Instance ID>. Any other service element can have an address defined in similar fashion. The above address fragment is, merely one example and other address formats can be used. In general, each address assigned to a given service element is unique to that service element and includes expresses the hierarchy associated with that service element.

Figure 3:
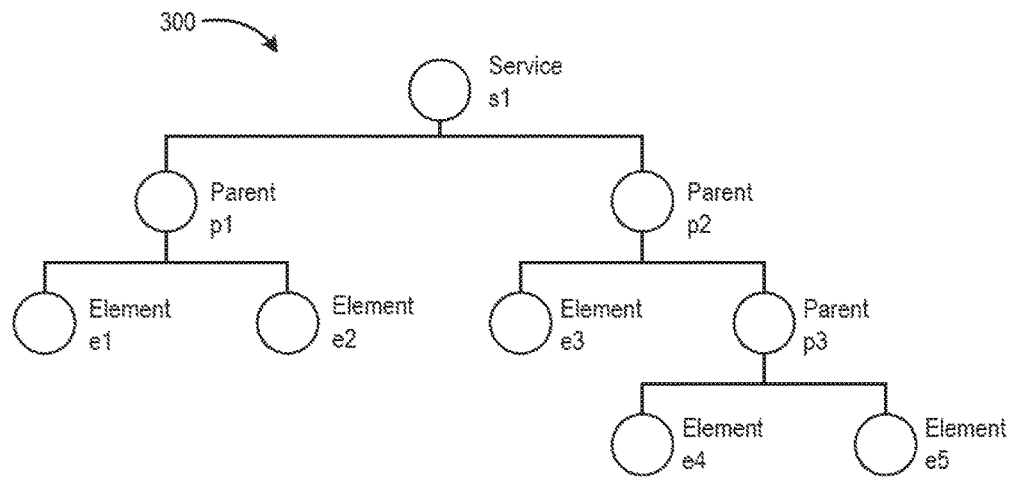
FIG. 3 is a block diagram depicting a service element hierarchy according to an embodiment.

FIG. 3 is a block diagram depicting a service element hierarchy 300 according to an embodiment. Service element hierarchy 300 includes service elements designated "e1", "e2", "e3", "e4", and "e5". Service elements e1 and e2 include a parent service element designated "p1". Service elements e4 and e5 include a parent service element designated "p3". Service elements e3 and p3 include a parent service element designated "p2". Service elements p1 and p2 include a parent service element designated "s1". In the example, hierarchy 300 includes four levels. Each service element can include an address that specifies between one and four levels. For example, the service element hierarchy 300 has a single root and nine distinct, addressable service elements enumerated as follows:

| Element Type: | Element Address |
|---|---|
| Service: | S=s1 |
| Parent: | S=s1/P=p1 |
| Element: | S=s1/P=p1/E=e1 |
| Element: | S=s1/P=p1/E=e2 |
| Parent: | S=s1/P=p2 |
| Element: | S=s1/P=p2/E=e3 |
| Parent: | S=s1/P=p2/P=p3 |
| Element: | S=s1/P=p2/P=p3/E=e4 |
| Element: | S=s1/P=p2/P=p3/E=e5 |

In this example, the service element s1 can have an address "S s1". The service element p1 can have an address "S=s1/P=p1". The service element e2 can have an address "S=s1/P=p1/E=e2". The service element e5 can have an address "S=s1/P=p2/P=p3/E=e5". These example addresses are symbolic and agnostic of any actual format. In practice, addresses can have various formats, as noted above.

Returning to FIG. 2, processing node router 206 determines an address for each metric packet corresponding with the monitored service element associated with the metric packet. In some cases, the metric packet can already include the address corresponding to its monitored service element. If the metric packet does not include the address, processing node router 206 can use identifying information in the metric packet to generate or otherwise lookup the corresponding address. Processing node router 206 can then append the address to the metric packet. In another embodiment, the identifying information in the metric packet can be such that an address can be determined algorithmically from the identifying information. In such an embodiment, it is not necessary to append the address to the metric packet, since it can be determined at any time, given only the identifying information. Once the address is determined, processing node router 206 cooperates with partition manager 208 to route the metric packet to the appropriate processing node. Processing node router 206 and partition manager 208 can be implemented as software executing on one or more computer systems (either real or virtual).

Monitoring system 190 dynamically partitions the address space of each hierarchy into multiple partitions. Each address subspace is assigned to a dedicated processing node.

In an embodiment, monitoring system 190 partitions the address space of each hierarchy using consistent hashing. A consistent hashing scheme can be understood as follows: A hash of each service element address can be mapped to a point on the edge of a circle (or equivalently mapped to a real angle). Each processing node 210 is mapped to one or more pseudo-randomly distributed points on the edge of the same circle. To find which system node manages which address, the system finds the location of the addresses' hash on the edge of the circle and then walks around the circle until encountering the first processing node. The result is that each processing node 210 manages a bucket of addresses located between its point(s) on the edge of the circle and previous point(s) of other processing node(s) 210. If a processing node becomes unavailable, the point(s) on the edge of the circle it maps to is/are removed. Addresses that previously fell into the address bucket managed by the failed processing node now map to bucket(s) of functioning processing node(s). That is, the addresses mapped to the lost address bucket are redistributed among the remaining buckets. A similar process occurs when a new processing node is added. A new processing node is mapped to one or more pseudo-randomly distributed points on the edge of the circle, which results in a new address bucket. Addresses that fall into the new address bucket are now routed to the new system processing node.

Partition manager 208 can use a partitioning scheme, such as consistent hashing, to establish a plurality of address buckets. In general, partition manger 208 can use any type of partitioning scheme. Each address bucket is mapped to a particular processing node 210. Given the hash of an address, partition manager 208 can identify the address bucket and associated processing node. Partition manager 208 can dynamically partition the address space among processing nodes 210. When a processing node 210 fails, partition manager 208 can repartition the address space among the remaining processing nodes. Likewise, when a processing node 210 is added, partition manager 208 can repartition the address space among all functioning processing nodes. Processing node router 206 can query partition manager 208 with an address, and partition manager 208 can return the identity of a processing node 210. In this manner, processing node router 206 routes metric packets among processing nodes 210 based on corresponding address.

Figure 4:
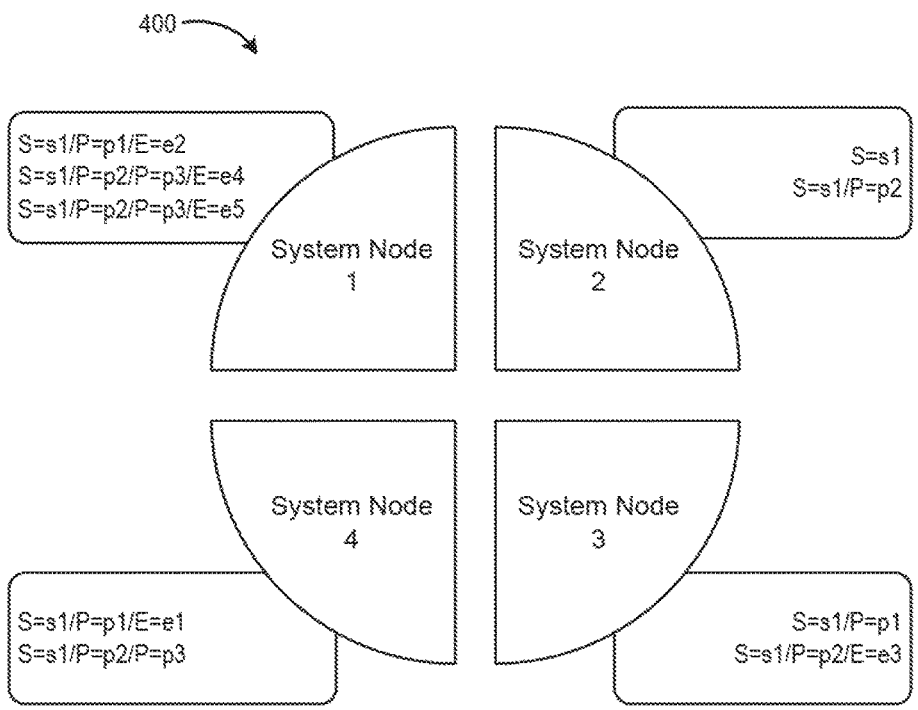
FIG. 4 is a block diagram depicting a mapping of addresses to system nodes for the service element hierarchy shown in FIG. 3 according to an embodiment.

FIG. 4 is a block diagram depicting a mapping 400 of addresses to processing nodes for hierarchy 300 shown in FIG. 3 according to an embodiment. In mapping 400, there are four processing nodes designated 1, 2, 3, and 4. Processing node 1 is assigned an address bucket that includes addresses S=s1/P=p1/E=e2, S=s1/P=p2/P=p3/E=e4, and S=s1/P=p2/P=p3/E=e5. Processing node 2 is assigned an address bucket that includes addresses S=s1 and S=s1/P=p2. Processing node 3 is assigned an address bucket that includes addresses S=s1/P=p1 and S=s1/P=p2/E=e3. Processing node 4 is assigned an address bucket that includes addresses S=s1/P=p1/E=e1 and S=s1/P=p2/P=p3. Metric packets received from element e1 are routed to processing node 4. Metric packets received from element e2 are routed to processing node 1. Metric packets received from element e3 are routed to processing node 3. Metric packets received from element e4 are routed to processing node 1. Metric packets received from element e5 are routed to processing node 1.

Returning to FIG. 2, each processing node 210 includes a packet handler 212, a data processor 214, and a storage interface 216. Each processing node 210 can be implemented using one or more computers (either real or virtual). Packet handler 212, data processor 214, and storage interface 216 can comprise software executing on the computer(s). Packet handler 212 is configured to receive metric packets from processing node router 206 and provide metric data to data processor 214. Packet handler 212 can also provide the identity of the service element to which this metric data pertains. Data processor 214 can perform any type of processing on the metric data based on the type of metric data and/or level of hierarchy for the service element. For example, data processor 214 can compare metric data with thresholds, generate alarms, convert metric data into different forms, process metric data through various algorithms or mathematical functions, and the like. Data processor 214 provides metric data to be stored to storage interface 216.

Storage interface 216 cooperates with persistent storage 218 to store metric data. For example, persistent storage 218 can maintain a database 220 to store metric data. In some cases, data processor 214 can provide the raw metric data to storage interface 216 (e.g., CPU utilization). In other cases, data processor 214 can provide some function of the metric data to storage interface 216 (e.g., average CPU utilization). As such, database 220 can store both raw metric data ("raw data 222") and aggregate metric data ("aggregate data 224").

In some processing operations, data processor 214 may require previously received metric data for other service nodes (e.g. aggregation functions, such as average, sum, maximum, minimum, standard deviation, and the like). Data processor 214 can cooperate with storage interface 215 to query database 220 to obtain the previously received metric data for the aggregation function. Alternatively, data processor 214 can maintain a cache of metric data from which the previously received metric data can be obtained.

After processing the metric data or concurrently with processing the metric data, packet handler 212 retransmits the metric packet to processing node router 206 as if the metric packet had originated from the immediate parent service element. In an embodiment, packet handler 212 can modify the address to identify the parent service element rather than the service element. If packet handler 212 determines that there is no parent service element, packet handler 212 does not retransmit the metric packet. If the service element address is appended to the metric packet, packet handler 212 can modify the service element address accordingly. Otherwise, packet handler 212 can modify any identifying information in metric packet so that the metric packet appears to have originated from the determined parent service element. Processing node router 206 then routes the metric packet based on address as described above.

Referring to the example of FIG. 4, assume a metric packet originates from service element e5. The metric packet is routed to processing node 1, which processes the metric data (e.g., CPU utilization). Processing node 1 determines the parent for element e5 (e.g., p3). For example, processing node 1 can discard the last segment of e5's address to arrive at an address of S=s1/P=p2/P=p3. Processing node 1 retransmits the metric packet as if the metric packet had originated from service element p3. The metric packet is then routed to processing node 4, which processes the metric data. For example, if the metric packet includes CPU utilization, processing node 4 can compute the latest average CPU utilization across all children service elements (e.g., service elements e4 and e5) taking into consideration the newly arrived CPU utilization data. Processing node 4 determines the parent for element p3 (e.g., p2) and retransmits the metric packet as if the metric packet had originated from service element p2. The metric packet is then routed to processing node 2, which processes the metric data. For example, if the metric packet includes CPU utilization, processing node 2 can compute the latest average CPU utilization across all children service elements (e.g., service elements e3 and p3) taking into consideration the newly arrived CPU utilization data. Processing node 2 determines the parent for element p2 (e.g., s1) and retransmits the metric packet as if the metric packet had originated from service element s1. The metric packet is then routed to processing node 2, which processes the metric data. For example, if the metric packet includes CPU utilization, processing node 2 can compute the latest average CPU utilization across all children service elements to s1 (e.g., service elements p1 and p2) taking into consideration the newly arrived CPU utilization data. Processing node 2 determines that there is no parent to service element s1 and stops retransmission of the metric packet.

Returning to FIG. 2, the process of processing a metric packet can be understood from the following algorithm in pseudo-code:

```
INPUT
    A[ ] <- element_addresses
    d <- metric_data
    k <- system_node_count
    c <- nil
    n <- nil
BEGIN
    foreach ( a in A[ ] ) {
        loop (! empty(a) ) {
            c <- consistent_hash(a, k)
            n <- node_for(c)
            d <- process_data(....)
            a <- parent_address(a)
        }
    }
END
```

In the example algorithm, the array A [ ] includes each address associated with the metric packet (e.g., the monitored service element can be associated with one or more hierarchies). The variable k stores the number of processing nodes 210. For each address a in the array A [ ], monitoring system 190 executes the loop until address a is empty. In the loop, processing node router 206 or partition manager 208 computes a consistent hash of the address (a) given the number of nodes (k) and assigns the value to the variable (c) (using the function consistent_hash( )). Processing node router 206 or partition manager 208 then determines the processing node to which the metric packet should be routed and assigns the value to the variable (n) (using the function node_for( )). Data processor 214 in a selected processing node 210 processes the metric data, which may be a function of one or more other values (e.g. previous metric data) using the function process_data( ). Packet handler 212 in the selected processing node 210 determines a parent address using the function parent_address( ) and assigns the value to (a). When there is no parent for the address stored in (a), the loop exits.

API server 228 can provide an API for monitoring clients 192. The API can include various interfaces to access metric data stored in database 220. Using API server 228, monitoring clients 192 can obtain raw data 222 and/or aggregate data 224 for various service elements.

Figure 5:
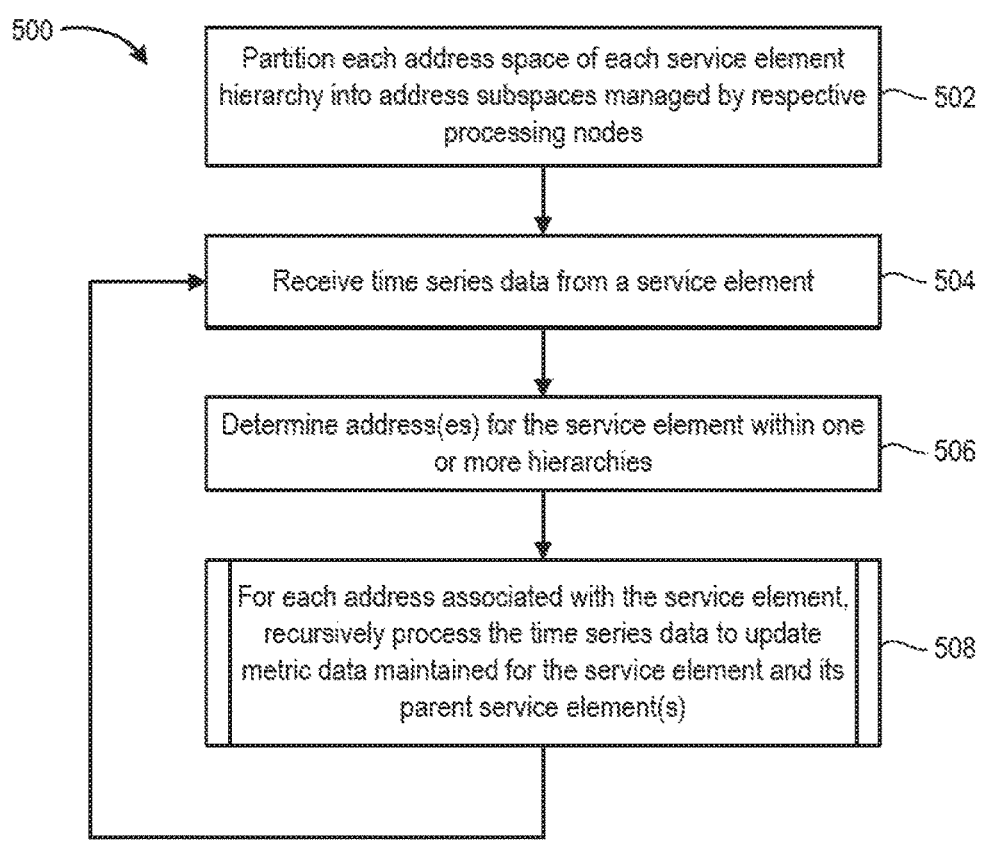
FIG. 5 is a flow diagram depicting a method of monitoring service elements in a cloud computing system according to embodiments.

FIG. 5 is a flow diagram depicting a method 500 of monitoring service elements in a cloud computing system according to embodiments. Method 500 can be performed by monitoring system 190 described above. Method 500 begins at step 502, where monitoring system 190 partitions each address space of each service element hierarchy into address subspaces managed by respective processing nodes 210. In an embodiment, monitoring system 190 can partition the address spaces for management among processing nodes 210 using a consistent hashing scheme.

At step 504, monitoring system 190 receives time series data from a service element. For example, processing node router 206 can receive time series data from an agent 204 associated with an entity 203 in monitored service elements 202.

At step 506, monitoring system 190 determines address(es) for the service element within one or more hierarchies. As described above, a given service element can belong within one or more hierarchies and can include a unique address within the address space of each hierarchy to which it belongs. In embodiments, processing node router 206 can obtain the address(es) from metric packer(s) carrying the time series data. In other embodiments, processing node router 206 can determine the address(es) from identifying data within metric packet(s) carrying the time series data.

At process 508, for each address associated with the service element, monitoring system 190 recursively processes the time series data to update metric data maintained for the service element and its parent service element(s). Metric data for the service element and its parent service element(s) can be maintained in persistent storage 218. Processing nodes 210 can process the time series data and update metric data in persistent storage 218. Processing nodes 210 recursively feed the time series data back to processing node router 206 to update metric data for the parent service element(s). An embodiment of process 508 is described below with respect to FIG. 6.

Figure 6:
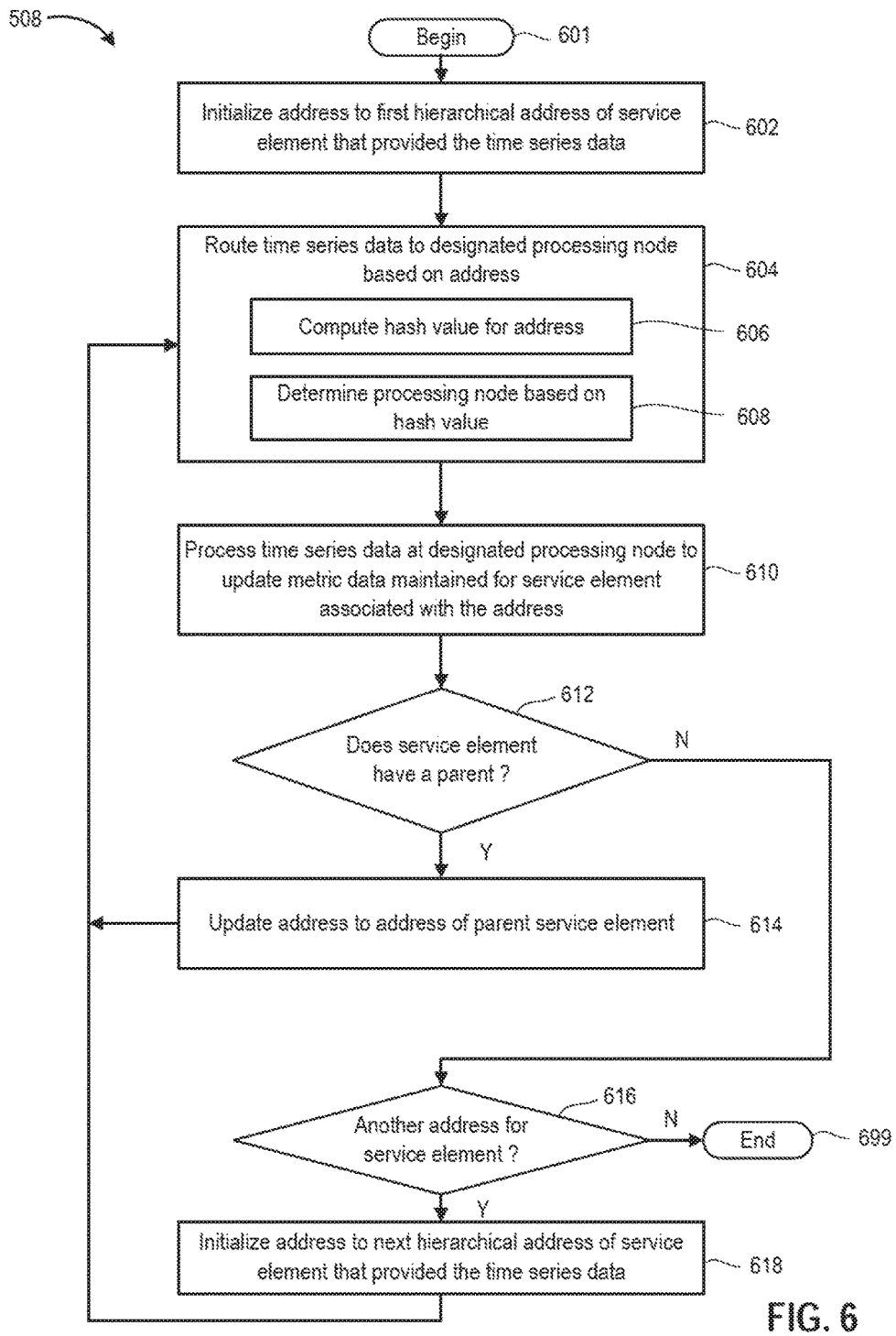
FIG. 6 is a flow diagram depicting a process for recursively routing time series data among processing nodes according to an embodiment.

FIG. 6 is a flow diagram depicting process 508 for recursively routing time series data among processing nodes according to an embodiment. Process 508 begins at step 601. At step 602, monitoring system 190 initializes an address associated with the time series data to the first hierarchical address of the service element that provided the time series data. As noted previously, a given service element may be associated with multiple hierarchies and can thus have multiple unique addresses. The first such address is selected at step 602. \

At step 604, monitoring system 190 routes the time series data to a designated processing node 210 based on the address. In an embodiment, the address space of each service element hierarchy is partitioned using a consistent hashing scheme. At step 606, monitoring system 190 can compute a hash value for the address. At step 608, monitoring system 190 can determine the designated processing node based on the hash value. In an embodiment, steps 606 and 608 can be performed by processing, node router 206, partition manager 208, between both processing node router 206 and partition manager 208.

At step 610 monitoring system 190 processes the time series data at the designated processing node 210 to update metric data maintained for the corresponding service element associated with the address. In an embodiment, metric data for the various service elements is maintained in database 220 of persistent storage 218. Various types of processing for the time series data are discussed above.

At step 612, monitoring system determines whether the service element associated with the address has a parent. In an embodiment, the address is specified hierarchically and thus an address of a parent service element can be determined directly from the address itself. If the service element has a parent, process 508 proceeds to step 614. Otherwise, process 508 proceeds to step 616.

At step 614, monitoring system 190 updates the address for the time series data to the address of the selected parent service element. Process 508 then returns to step 604, where the time series data is routed as if it originated from the selected parent service element.

At step 616, monitoring system 190 determines whether there is another hierarchical address for the service element. If not, process 508 ends at step 699. Otherwise, process 508 proceeds to step 618. At step 618, monitoring system initializes the address associated with the time series data to the next hierarchical address of the service element that provided the time series data. Process 508 then returns to step 604 and repeats.

Figure 7:
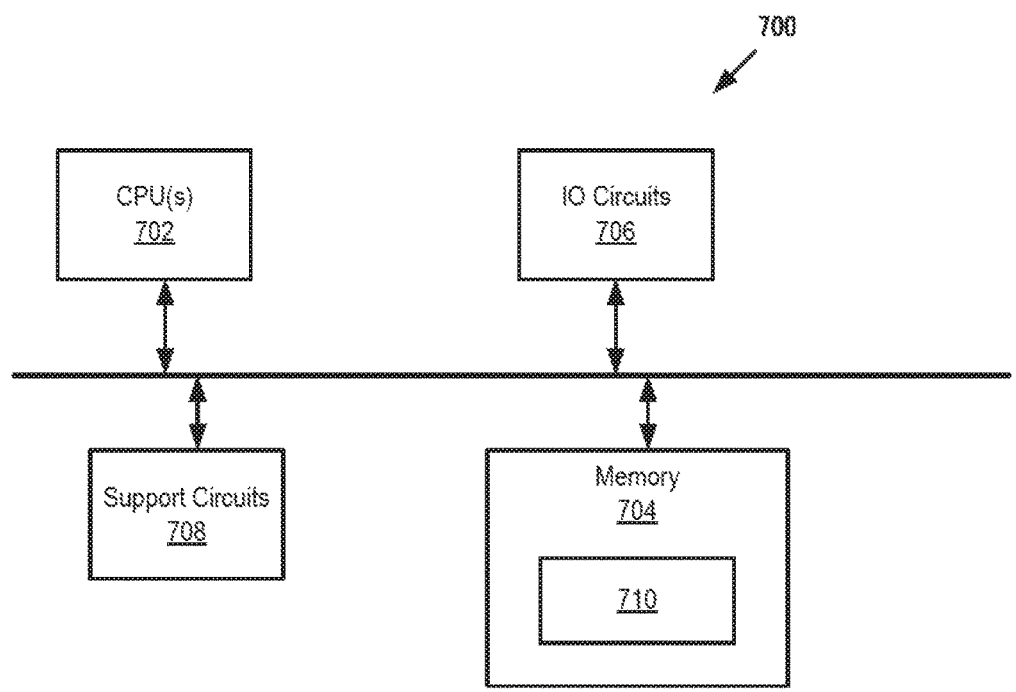
FIG. 7 is a block diagram depicting an example of a computer system in which one or more embodiments of the present disclosure may be utilized.

FIG. 7 is a block diagram depicting an example of a computer system 700 in which one or more embodiments of the present disclosure may be utilized. Computer system 700 of a plurality of instances of computer system 700 can be used to implement monitoring system 190. Computer system 700 includes one or more central processing units (CPUs) 702, memory 704, input/output (IO) circuits 706, and various support circuits 508. Each of CPUs 702 can include any microprocessor known in the art and can execute instructions stored on computer readable storage, such as memory 704. Memory 704 can include various volatile and/or non-volatile memory devices, such as random access memory (RAM), read only memory (ROM), and the like. Instructions and data 710 for performing the various methods and techniques described above can be stored in memory 704 for execution by CPUs 702. That is, memory 704 can store instructions executable by CPUs 702 to perform one or more steps/sub-steps described above. Support circuits 708 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including band-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating systemlevel virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of monitoring service elements in a cloud computing system, comprising:
   partitioning an address space of a hierarchy of service elements into a plurality of address subspaces managed by a respective plurality of processing nodes;
   receiving time series data from a service element in the hierarchy of service elements;
   routing the time series data to a first processing node of the plurality of processing nodes based on an address of the service element within the hierarchy of service elements;
   processing the time series data at the first processing node to update metric data maintained for the service element;
   routing the time series data to a second processing node of the plurality of processing nodes based on an address of a parent service element above the service element in the hierarchy of service elements; and
   processing the time series data at the second processing node to update metric data maintained for the parent service element.

2. The method of claim 1, further comprising:
   routing the time series data to at least one of the processing nodes based on at least one address of at least one additional parent service element above the service element in the hierarchy; and
   processing the time series data at each of the at least one processing node to update metric data maintained for each of the at least one additional parent service element.

3. The method of claim 1, wherein the time series data comprises at least one metric packet having at least one value for each of at least one metric associated with the service element.

4. The method of claim 1, wherein the address space of the hierarchy of service elements is partitioned into the plurality of address subspaces using consistent hashing.

5. The method of claim 4, wherein the step of routing the time series data to the first processing node comprises:
   computing a first hash value based on the address of the service element; and
   identifying the first processing node as a first destination for the time series data based on the hash value.

6. The method of claim 5, wherein the step of routing the time series data to the second processing node comprises:
   determining the address of the parent service element from the address of the service element;
   computing a second hash value based on the address of the parent service element; and
   identifying the second processing node as a second destination for the time series data based on the second hash value.

7. The method of claim 1, wherein the step of processing the time series data at the first processing node comprises:
   storing one or more values in the time series data in persistent storage accessible by the plurality of processing nodes.

8. The method of claim 1, wherein the step of processing the time series data at the second processing node comprises:
   combining one or more values in the time series data with other values to determine one or more aggregate values; and
   storing the one or more aggregate values in persistent storage accessible by the plurality of processing nodes.

9. The method of claim 1, wherein the service elements in the hierarchy are part of a hosted service provided by a cloud computing system.

10. The method of claim 9, wherein the service elements in the hierarchy each comprise one of a host computer, a hypervisor, a virtual machine, a software application, or a logical collection thereof.

11. A non-transitory computer readable medium comprising instructions, which when executed in a computer system, causes the computer system to carry out a method of partitioning an address space of a hierarchy of service elements into a plurality of address subspaces managed by a respective plurality of processing nodes;
   receiving time series data from a service element in the hierarchy of service elements;
   routing the time series data to a first processing node of the plurality of processing nodes based on an address of the service element within the hierarchy of service elements;
   processing the time series data at the first processing node to update metric data maintained for the service element;
   routing the time series data to a second processing node of the plurality of processing nodes based on an address of a parent service element above the service element in the hierarchy of service elements; and
   processing the time series data at the second processing node to update metric data maintained for the parent service element.

12. The non-transitory computer readable medium of claim 11, wherein the address space of the hierarchy of service elements is partitioned into the plurality of address subspaces using consistent hashing.

13. The non-transitory computer readable medium of claim 12, wherein the step of routing the time series data to the first processing node comprises:
   computing a first hash value based on the address of the service element; and
   identifying the first processing node as a first destination for the time series data based on the hash value.

14. The non-transitory computer readable medium of claim 13, wherein the step of routing the time series data to the second processing node comprises:
   determining the address of the parent service element from the address of the service element;
   computing a second hash value based on the address of the parent service element; and identifying the second processing node as a second destination for the time series data based on the second hash value.

\* \* \* \* \*